United States Patent [19]

Kompa et al.

[11] 3,906,395

[45] Sept. 16, 1975

[54] OPTICAL MOLECULAR AMPLIFYER

[76] Inventors: Karl L. Kompa; Peter Gensel; Jochen Wanner, all of Meiserstrasse 1, 8 Munich 2, Germany

[22] Filed: Mar. 17, 1971

[21] Appl. No.: 125,082

[30] Foreign Application Priority Data
Mar. 26, 1970 Germany.............................. 201493

[52] U.S. Cl. .......................................... 331/94.5 G
[51] Int. Cl. .............................................. H01s 3/22
[58] Field of Search .................................... 331/94.5

[56] References Cited
UNITED STATES PATENTS
3,560,876   2/1971   Airey ................................. 331/94.5
3,623,145   11/1971  Gregg et al. ...................... 331/94.5

OTHER PUBLICATIONS
Kompa et al., Hydrofluoric Acid Chemical Laser. J. Chem. Phys. Vol. 47, (1967) pp. 857 and 858.

*Primary Examiner*—Williams L. Sikes
*Attorney, Agent, or Firm*—Hill, Gross, Simpson, Van Santen, Steadman, Chiara & Simpson

[57] ABSTRACT

An optical molecular amplifyer having a reactive mixture of chemicals which react upon impingement by a flash light impulse to produce a reaction product and energy for pumping the reaction product, which under these conditions radiates a coherent light. The reactive mixture is comprised of a mixture of a material selected from the group consisting of hydrogen, hydrogen compounds, deuterium, deuterium compound and mixtures thereof, and a fluoride compound of a general formula $MF_n$, which is photolysized in a gas phase. M is an element selected from the group consisting of chlorine, bromine, iodine, sulfur and nitrogen and $n$ is a whole numeral. The reaction conditions are selected so as to ensure that a chain reaction occurs.

13 Claims, 1 Drawing Figure

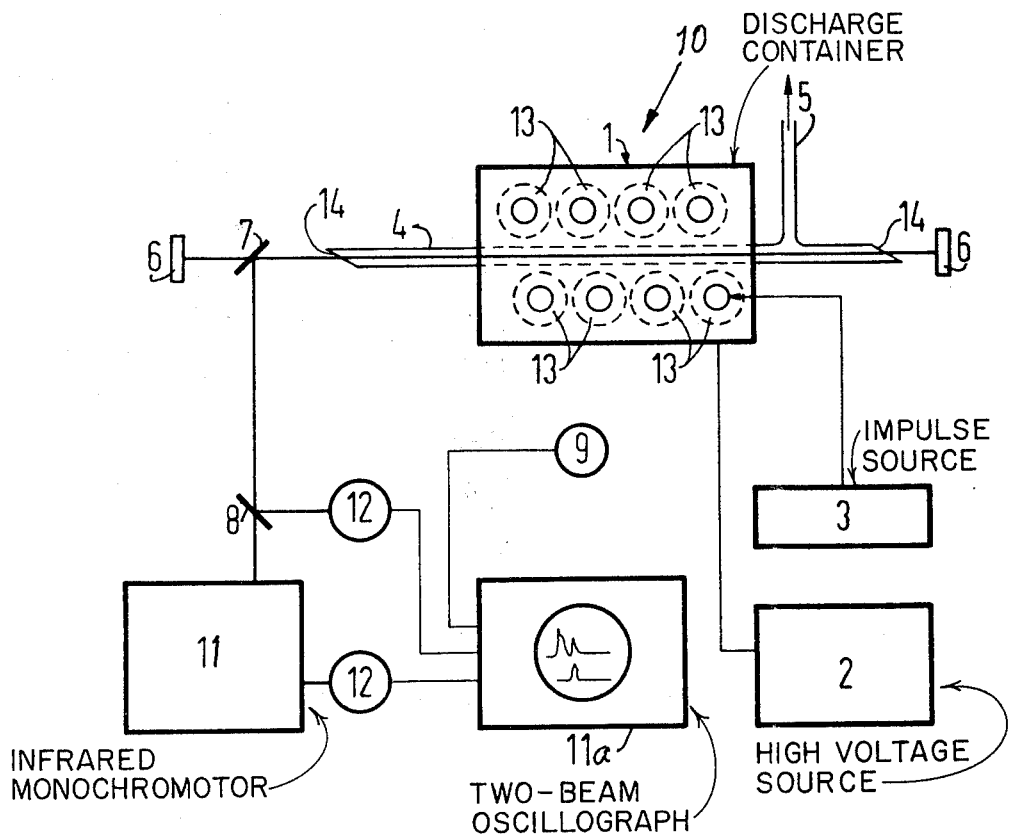

OPTICAL MOLECULAR AMPLIFYER

BACKGROUND OF THE INVENTION

1. Field of the Invention

The invention generally relates to optical molecular amplifiers and more particularly to optical molecular amplifiers (chemical lasers) providing an output energy greater than the input energy.

2. Prior Art

Reactive components, such as fluorine atoms, which enter into a laser pumping reaction are formed with various prior art laser devices by means of flash photolysis. The output energy of such known lasers is less than the input energy of the light source (which is applied for photolysis) as long as the chemical reaction therein does not become a chain reaction. In a wide number of reaction systems that produce hydrogen fluoride, laser characteristics have been found in those which are based on elementary exchange reactions. On the basis of this, it is known that a reaction occurring in accordance with the equation:

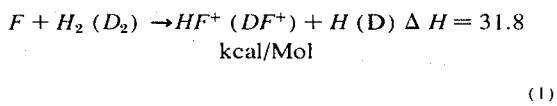

$$F + H_2 (D_2) \rightarrow HF^+ (DF^+) + H (D) \quad \Delta H = 31.8 \text{ kcal/Mol}$$

(1)

is the main pumping reaction, along with a number of less well defined secondary reactions. Accordingly, the output energy of such known systems is less than the input energy.

It is an object of the invention to provide a chemical laser capable of producing an output energy greater than the input energy (while taking into account the different photo energies of photolysis light and laser radiation).

SUMMARY OF THE INVENTION

In its more general aspects the invention provides an optical molecular amplifier, sometimes referred to as a chemical laser, capable of providing output energies greater than the input energies. The reactive mixtures of chemicals are arranged in a suitable device (such as a quartz tube) and subjected to energy-pressure conditions sufficient to initiate and maintain a chain reaction producing a reaction product and pumping energy so that coherent light radiations are produced. The reactive chemicals are a mixture of a material selected from the group consisting essentially of hydrogen, hydrogen compounds, deuterium, deuterium compounds, and mixtures thereof, and a photolizable fluoride compound of the general formula $MF_n$ wherein M is selected from the group consisting of chlorine, bromine, iodine, sulfur and nitrogen and $n$ is a whole integer. The reactive chemicals are confined in a suitable container and the partial pressure of the fluoride compound is adjusted so as to be in a range of about 0.1 through about 30 Torr and the reaction is initiated by a flash light discharge having a pulse width of up to about 50 micro seconds.

BRIEF DESCRIPTION OF THE DRAWING

The single FIGURE is a schematic illustration of a structural embodiment of the invention in an operationally analytical environment.

DESCRIPTION OF THE PREFERRED EMBODIMENTS

The invention provides an optical molecular amplifier (chemical laser) of the hydrogen-fluoride type having a radiation of more than 1. In other words, the output energy from the optical molecular amplifier of the invention is greater than the input energy, while taking into account the different photo energies of photolysis light and laser radiation.

In accordance with the principles of the invention, a reactive chemical mixture composed of a material selected from the group consisting essentially of hydrogen, a hydrogen compound, deuterium, a deuterium compound and mixture thereof and a photolizable fluoride compound of the general formula $MF_n$ wherein M is selected from a group consisting of bromine, iodine, sulfur and nitrogen is positioned in a suitable container and subjected to reaction conditions sufficient to initiate a chain reaction.

In a preferred embodiment, the reactive chemical mixture consists of hydrogen and iodine pentafluoride. Preferably a 1 volume portion of iodine pentafluoride is combined with each volume portion of hydrogen and the mixture is confined and pressurized in a suitable container, such as a quartz tube. The partial pressure of iodine pentafluoride is preferably adjusted so as to be in the range of about 0.1 through about 30 Torr. This reactive mixture is caused to react by means of a xenon flashing lamp or a gas spark-path discharge means (preferably utilizing nitrogen). The width of the starting impulse or flash in regard to time must be very short and preferably is less than about 50 micro seconds. As will be appreciated, the reactive chemical mixtures are also selected from the aforesaid groups of chemicals and the chain reaction conditions are adjusted in accordance with the particular mixture being utilized.

The chemical laser of the invention utilizes not only the reaction scheme set in our equation (1) but additionally appears to utilize a reaction in accordance with the general formula:

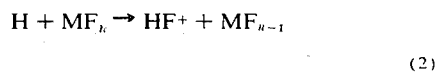

$$H + MF_n \rightarrow HF^+ + MF_{n-1}$$

(2)

as well as other similar reactions with other hydrogen compounds, heavy hydrogen (deuterium) and/or deuterium compounds, all of which reactions exhibit pumping characteristics.

The mechanism of the reaction in the laser devices of the invention is more easily ascertained by an observation of the spectrum of emission lines and correlating them to the quantum radiation yield obtained.

Referring now to the drawing, a sample of an operationally analytical environment arrangement 10 is schematically illustrated in a form useful for laser beams. It should be noted that lasers and/or optical amplifiers have a wide variety of uses, including cutting, welding, drilling and scribing operations, as well as many other uses and the invention is useful in these and other related areas.

In the arrangement 10, a vacuum-tight discharge container of tube 1 is illustrated as being provided with eight spark-discharge path means 13 generally symmetrically arranged therein. The spark-discharge path means 13 are operationally connected to high voltage source 2, which is adapted to supply a voltage of about 20 to 30 kV. An inpulse source 30 is also operationally connected to the spark-discharge path means 13 and provides a starting impulse for the activation of the spark-discharge path means.

A laser tube 4 is positioned so as to extend through the discharge container 1 and is provided with frontal surfaces, which are closed by windows 14 arranged in accordance with the Brewster angle. The windows 14 are composed of a material passing infrared light and preferably are of saphire. The laser tube 4 is also provided with a means 5 for operationally communicating with a vacuum means (not shown) and/or with a supply source means (not shown) for providing the reactive chemical mixture to the tube 4. Of course, appropriate valving and related means are provided to insure a proper operation.

Hollow mirrors 6 are arranged in a prolongation of the laser tube axis so as to define the laser resonator therebetween. A decoupling plate 7 is suitably positioned along the laser axis in front of one of the mirrors 6 for decoupling a portion of the radiation produced. The decoupling plate 7 is composed of a material passing infrared light, for example sodium chloride. A beam divider 8 is suitably positioned to receive the decoupled laser beam from the plate 7 and divided into two further beams. An infrared monchromotor 11 is positioned to receive one such beam and an infrared detector 12 is positioned to receive the other beam.

A two beam oscillograph 11a and a photo diode 9 are operationally arranged and coupled to aid in the control of the light flash impulses that are applied to initiating the chain reaction within the tube 4. It will be noted that a second infrared detector 12 is operationally positioned between the monchromotor 11 and the two beam oscillograph 11a.

A mixture of iodine pentafluoride and hydrogen in a mixing ratio of 1:1 were placed in the laser tube 4 and the tube pressurized until a pressure of about 25 mm Hg was obtained. Then the impulse source 3 was activated to release a 30 kV impulse to the spark-discharge path means 13. This produced a light impulse flash having a duration of 1.4 micro seconds and an increase time of 500 nano seconds in the discharge tube 1. Thereafter, the laser impulse which was thus produced, was examined with the aid of the monochromoter 11 and the infrared detectors 12.

In this manner the following emission lines were detected in the first impulse level:

$v = 2$-1, P (2), (3), (4), (5), (6), (7);

$v = 3$-4, P (4)-very weak;

$v = 5$-4, P (2), (3), (4), (5), (6), (7);

$v = 6$-5, P (4), (5)

The emission of these lines lie between 2.7 and 3.4 microns ($\mu$). No $v = 1$-0 transits were detected under the stated operational conditions.

However, a group of at least 13 lines were observed in a range between 3.5 to 3.95 microns with an intensity that was greater than that noted for the above detected lines. These highly intense group of lines appeared in the later portion of the time-profile of the laser emission. It is to be noted that the emissions observed in the area above 3.5 $\mu$ are in opposition to the behavior of the known chemical lasers of hydrogen fluorides. These emissions can not presently be assigned a line of the hydrogen-fluoride rotation-oscillation transits.

Since the reaction set forth in equation (1) can not pump any higher hydrogen fluoride energy states than $v = 3$, the occurrence of transits above $v = 3$-2 can only be explained by the presence of an exothermic second pumping reaction. In the exemplary embodiment set forth above, the general equation probably is:

$$H + IF_5 \rightarrow HF^+ + IF_4$$

(2a)

since it explains the observed energy levels; of course, additional reactions more than likely sequentially follow that set forth in equation (2a).

A molecule of iodine pentafluroide has an average I-F binding energy of about 63 kcl/Mol and in accordance with the equations (2) or (2a) might supply sufficient energy to stimulate the energy state of $v = 6$ of the hydrogen fluoride molecule (about 70 kcl).

The observed laser emission produced in accordance with the principles of the invention can be readily explained if one assumes that a reaction in accordance with equations:

$$F + H_2 \rightarrow HF + H$$

(1a)

$$H + IF_5 \rightarrow HF + IF_4$$

(2a)

and possibly $$IF_4 \rightarrow IF_3 + F$$

(4)

occur in the form of a chain reaction in accordance with the overall equation:

$$IF_5 \rightarrow IF_4 + F$$

(3)

This overall equation results from the photolytical splitting of the iodine pentafluoride molecule by the initiating flash impulse.

Further, the concept of energy balance also promotes the assumption of such a chain reaction. An output energy of only 0.87 ml on the basis of the absorbed light quantum would be observed if only a single reaction in accordance with equation (1) had occurred, but an output energy of at least 1.8 ml was actually observed. Accordingly, a chain reaction appears to be present. It will be appreciated that the above theoretical discussions are set forth only in an attempt to explain the mechanisms of energy transfers occuring within the invention but that these theoretical discussions in no way limit the actual invention.

It will be understood that modifications and variations may be effected without departing from the spirit and scope of the novel concepts of the present invention.

We claim as our invention

1. An optical molecular amplifier comprising:
a container means for a reactive chemical mixture, a flash impulse means operatively associated with said container means for supplying a flash impulse thereto, reflector means positioned along the axes of said container means at opposite ends thereof to define a laser resonator, and a reactive chemical mixture in said container means comprised of a mixture of a material selected from the group consisting essentially of hydrogen, a hydrogen compound, deuterium, a deuterium compound, and mixtures thereof and a photolizable fluoride compound of the general formula $MF_n$ wherein M is selected from the group consisting essentially of chlorine, bromine, iodine, sulfur and nitrogen and $n$ is a whole integer, whereby the flash impulse triggers a chain reaction of said reactive mixture to produce a reaction product and energy for pumping the reaction product so as to produce a coherent light.

2. An optical amplifier as defined in claim 1 wherein the reactive chemical mixture consists essentially of a mixture of hydrogen, deuterium and iodine pentafluoride.

3. An optical amplifier as defined in claim 2 wherein the reactive chemical mixture consists of a mixture of a 1 volume portion of iodine pentafluoride for each volume portion of hydrogen.

4. A method of producing a coherent light comprising the steps of (1) confining a reactive chemical mixture consisting essentially of a mixture of a material selected from the group consisting essentially of hydrogen, a hydrogen compound, deuterium, a deuterium compound, and mixture thereof and a photolizable fluoride compound of the general formula $MF_n$ wherein M is selected from the group consisting essentially of chlorine, bromine, iodine, sulfur and nitrogen and $n$ is a whole integer in a suitable container means and under reaction conditions selected to provide a chain reaction of said mixture, (2) triggering a chain reaction of said chemical mixture by releasing a flash impulse having a pulse width of less than about 50 micro seconds into said mixture, and (3) resonating the radiation produced until a coherent light is achieved.

5. A method of producing a coherent light as defined in claim 4 wherein the ratio of the fluoride compound to the other material in the reactive chemical mixture is essentially 1:1.

6. In an optical molecular amplifier having an operational environment for producing a coherent light from a reactive mixture of chemicals undergoing a chain reaction initiated by a light impulse so as to produce a reaction product and energy for pumping the reaction product whereby a coherent light is radiated, the improvement comprising, a reactive chemical mixture consisting essentially of a mixture of a material selected from the group consisting essentially of hydrogen, a hydrogen compound, deuterium, a deuterium compound and mixtures thereof and a photolizable fluoride compound of the general formula $MF_n$ wherein M is an element selected from the group consisting essentially of chlorine, bromine, iodine, sulfur and nitrogen and $n$ is a whole integer.

7. In an optical molecular amplifier as defined in claim 6 wherein the reactive chemical mixture consist essentially of a mixture of iodine pentafluoride and hydrogen.

8. In an optical molecular amplifier as defined in claim 7 wherein the ratio of iodine pentafluoride to hydrogen in the chemical mixture is about 1:1.

9. A high energy chemical laser system comprising:
means defining an optical cavity;
an explosive gaseous mixture including a reducing agent providing reactive hydrogen isotope species and interhalogen compounds within said cavity; and
means for uniformly igniting said gaseous mixture, whereby an exothermic chemical reaction is produced yielding a lasing reaction species, which releases energy suitable for pumping that lasing species at a sufficient rate to generate an extremely large population inversion.

10. A high energy chemical laser system comprising:
means defining an optical cavity;
an explosive gaseous mixture including a reducing agent providing reactive hydrogen isotope species and nitrogen fluorine compounds within said cavity; and
means for uniformly igniting said gaseous mixture;
whereby an exothermic chemical reaction is produced yielding a lasing reaction species, which releases energy suitable for pumping that lasing species at a sufficient rate to generate an extremely large population inversion.

11. The laser system defined in claim 10 wherein said explosive gaseous mixture is selected from the group consisting of $H_2 + NF_3$, $B_5H_9 + NF_3$ and $B_2H_6 + NF_3$.

12. The laser system as defined in claim 10 wherein said explosive gaseous mixture is at a pressure and the partial pressure of the nitrogen-fluoride compounds is in the range of about 0.1 through about 30 Torr.

13. The laser system defined in claim 12, wherein said igniting means includes flashlamp means.

* * * * *